Figure 1:
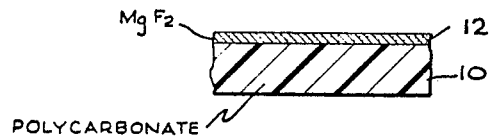

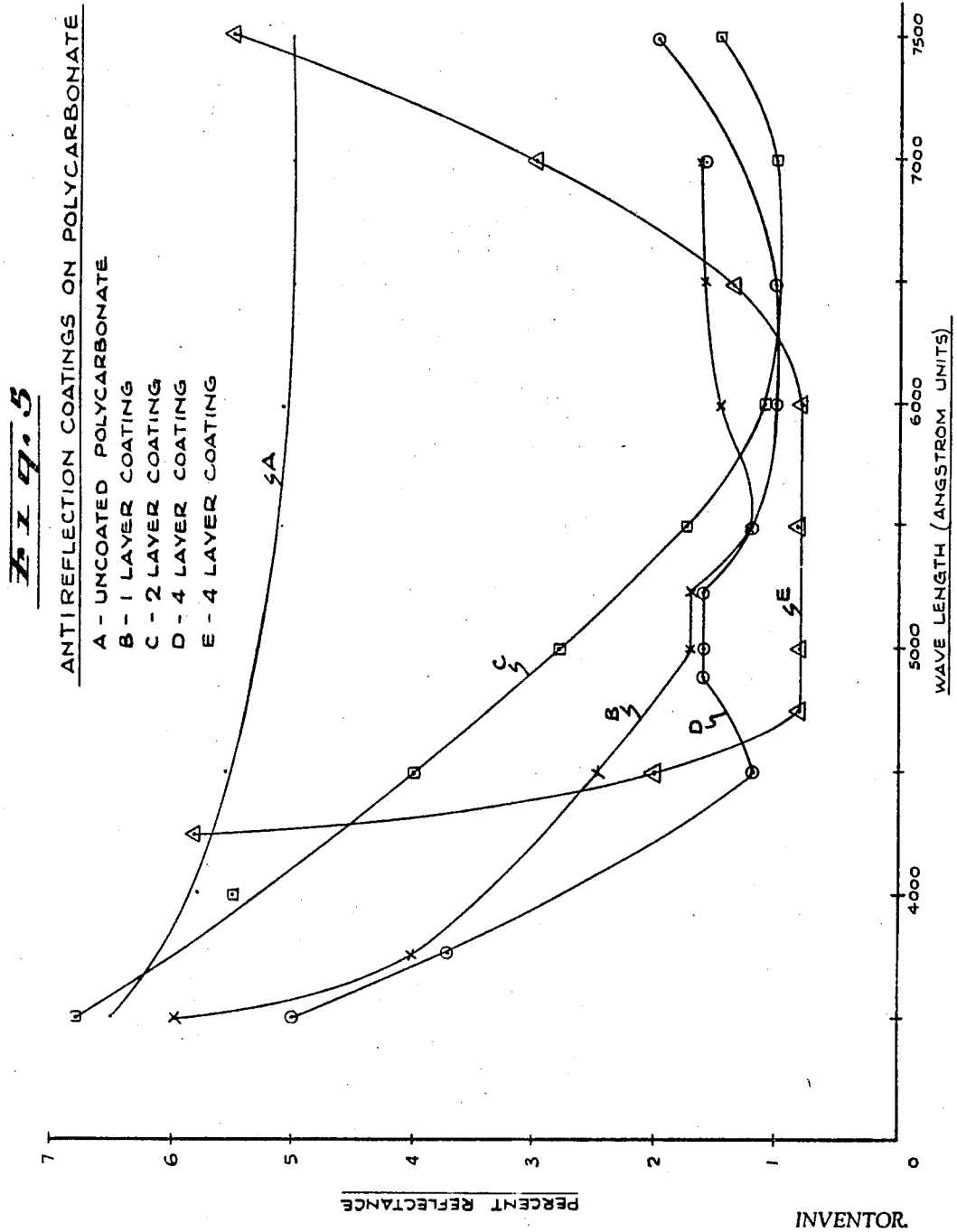

3,356,522
POLYCARBONATE FILM CONTAINING AN ANTIREFLECTION COATING

Barbara A. Libbert, Los Angeles, Calif., assignor, by mesne assignments, to McDonnell Douglas Corporation, Santa Monica, Calif., a corporation of Maryland
Filed Feb. 10, 1964, Ser. No. 343,637
8 Claims. (Cl. 117—33.3)

This invention relates to coated polycarbonate resin, and is particularly concerned with transparent polycarbonate plastic film or sheet having an antireflection coating thereon.

Polycarbonate thermoplastic film and sheeting have recently been made commercially available. Polycarbonate resins generally are formed by reaction of a dihydroxy compound and a carbonate diester. The commercially available form of this resin, as in film and sheets, is understood to be derived from bisphenol A and phosgene.

Increasing interest in polycarbonate sheets and films has been developed recently due to the outstanding physical, thermal and electrical properties of this material. Thus, polycarbonates are very tough over a broad temperature range, and have high tensile strength and elongation, and show good retention of strength characteristics at increasing temperatures. Also, polycarbonate sheet or film can be readily bonded to itself or to other materials, e.g., by cementing with epoxy adhesives or by heat sealing or press welding techniques. Of particular importance, transparent polycarbonate sheets and films have good optical clarity, and have outstanding light transmission characteristics over the visible spectrum. Hence, polycarbonate films and sheets have become attractive for use in photography, as light lenses and as light-transmission films when applied over cathode ray tubes.

However, in many optical applications of polycarbonate film, such as when applied as a light lens or as a light-transmission medium over a cathode ray tube, minimum surface reflection of light from the polycarbonate film or sheet is highly desirable. Although transparent polycarbonate films have a reflectance comparable to that of glass, the reflectance of such polycarbonate films being about 5.1% over the visible spectrum, in the above-noted applications it is important that such surface reflectance be substantially reduced for maximum efficiency in use.

It is known to apply antireflection coatings to glass. In such coating processes, it is necessary to maintain the substrate, that is, the glass, at a substantially elevated temperature, e.g., of the order of 600° F., during the deposition of the coating material on the glass in order to form adherent abrasion-resistant films. It is, of course, not possible to maintain the polycarbonate film or sheet at the above-noted elevated temperatures due to disintegration of the substrate at such high temperatures. Further, when it is attempted to heat these materials even at lower temperatures, the phenomenon known as "outgassing" of the plastic occurs, involving the release of gases from within the plastic and from the surface thereof, causing pitting and irregularities in the coating and rendering it difficult to apply a coating to the plastic surface under these conditions. Further, vaporized molecules of coating materials produced in the coating process tend to strike the plastic substrate in a manner such as to cause pitting or deformation of the surface.

One object of the invention accordingly is to provide a polycarbonate film or sheet with an antireflection coating.

A further object is to provide a transparent polycarbonate film having an antireflection coating formed from an inorganic dielectric material, having good light transmission and low light absorption in the visible spectrum, such coating substantially reducing the reflectance of the polycarbonate substrate substantially below its reflectance value in the absence of such coating.

A still further object is to provide a polycarbonate film or sheet containing an antireflection coating, particularly a multi-layer coating, which is adherent, abrasion-resistant and which is smooth and uniform over substantially the entire surface of the polycarbonate film.

Yet another object is the provision of procedure or technique for applying an antireflection coating, preferably an inorganic dielectric coating, to the surface of a polycarbonate film, without adversely affecting the physical characteristics, including strength and surface smoothness, of the polycarbonate material.

Other objects and advantages will be apparent hereinafter.

I have now surprisingly found that an antireflection coating can be applied to a polycarbonate sheet or film. Such antireflection coatings or films are preferably formed from inorganic dielectrics, for example magnesium fluoride and silicon monoxide, and particularly when deposited in the form of multilayer coatings, these coatings and strongly adherent to the polycarbonate substrate, and have good abrasion-resistance properties. Such antireflection coatings applied to the polycarbonate film or sheet as single- or preferably multilayer coatings have been found to reduce the surface reflectance thereof to a low value less than 2%, usually of the order of about 1% or less, e.g., down to about ½%. Of particular significance such low surface reflectance values of the polycarbonate-antireflection coating system are generally achieved over a substantial or major portion of the visible spectrum, and in many instances over substantially the entire visible spectrum of from about 4,000 to about 7,500 A. (Angstrom units).

It has been found that such antireflection coatings can be deposited upon the polycarbonate substrate rapidly and efficiently, while maintaining the substrate at substantially ambient temperature, and preferably at somewhat elevated temperature of the order of about 100° F. Under these conditions, the vaporized particles of the dielectric coating materials are deposited upon the polycarbonate film surface without damaging the smooth surface of the substrate, and with a minimum of out-gassing of the polycarbonate occurring.

The polycarbonate film or sheet substrate on which the antireflection coating is deposited can be of varying thickness. Thus, for example, commercially available transparent polycarbonate film which can be employed can have a thickness of from about 3 to about 10 mils. Antireflection films can, however, be deposited on polycarbonate sheets of thickness less than or substantially greater than the 3 to 10 mil range noted above. Hence, the term "film" or "sheet" as applied to the polycarbonate substrate in the specification and claims is intended to denote a substrate of any desired thickness.

The antireflection or interference coatings formed on the polycarbonate substrate, according to the invention, are formed from dielectric materials, preferably inorganic, having a low index of refraction and good evaporation qualities so as to be readily vaporized and deposited upon the surface of the substrate and to form a highly transparent stable substance thereon. Antireflection dielectric materials which can be employed according to the invention include, for example, magnesium fluoride, silicon monoxide, cryolite (sodium aluminum fluoride), zirconium dioxide, stannic oxide, and cerium oxide. The refractive index of each of the above-noted materials at 5500 A. is set forth in Table I below.

TABLE I

| Dielectric substance: | Refractive index at 5500 A. |
|---|---|
| $MgF_2$ | 1.38 |
| SiO (deposited slowly and oxidized) | 1.6–1.8 |
| SiO (deposited quickly and unoxidized) | 2.1 |
| $Na_3AlF_6$ (cryolite) | 1.30–1.33 |
| $ZrO_2$ | 2.1 |
| $SnO_2$ | 2.1 |
| $CeO_2$ | 2.1 |

The above materials can be deposited on the polycarbonate film either as single-layer antireflection or interference coatings which can be formed, for example, from magnesium fluoride or cryolite, or as multilayer antireflection coatings, preferably formed from 2 or more of the above-note dielectric materials.

For a single coating of dielectric, in order to substantially eliminate reflectance, the index of refraction of the coating must be equal to the square root of the index of refraction of the substrate, i.e., $$n_c = \sqrt{n_s}$$

where $n_c$ equals the refractive index of the coating and $n_s$ the refractive index of the substrate. Since the refractive index of polycarbonate resin is 1.58 (at 5500 A.), it is thus seen that the refractive index of the dielectric forming a single layer antireflection coating must be less than 1.58. This is satisfied, for example, by single layers of magnesium fluoride or cryolite which will reduce the percent reflectance substantially below that for the polycarbonate alone, as will be noted hereinafter.

It is preferred, however, to form multi-layer anti-reflection coatings since under these conditions a combination of the above-noted dielectrics can be chosen for the respective layers such that the composite refractive index for the multi-layer system is substantially less than the refractive index $n_s$ of the substrate. In addition, multilayer coatings provide a reduction of reflection over a broad band width of the visible spectrum or over substantially the entire visible spectrum.

In order to produce an efficient antireflection coating on the polycarbonate substrate, each layer of the antireflecting coating should have an optical thickness of ¼λ (lambda) or multiples thereof where λ is the wavelength at which the thickness is to be controlled, and which can be any wavelength within the visible spectrum, and can conveniently be chosen at about 5500 A., approximately the middle of the visible spectrum. Thus, for example, single-layer antireflection coatings of magnesium fluoride or sodium aluminum fluoride of ¼λ optical thickness can be formed on the polycarbonate substrate, and these coatings will have a minimum reflectance at the chosen wave length, for example, 5500 A.

Alternatively, 2-, 3- and 4-layer antireflection coatings on the polycarbonate substrate can be formed, providing substantially reduced reflectance for the resulting polycarbonate-antireflection coating systems as compared to the reflectance of the polycarbonate film in the absence of the coating. Each layer of these multiple-layer antireflection coatings can have an optical thickness of, for example, ¼λ, ½λ, or ¾λ, the dielectric material forming the respective layers and the thickness of the respective layers being chosen so as to obtain minimum reflectance. Mixtures of the aforementioned dielectrics can also be employed for producing one or more of the respective layers of the antireflecting coating in order to obtain a desired refractive index for each of such layers. Thus, for example, a mixture of magnesium fluoride and silicon monoxide can be employed to form a single layer of the antireflection coating.

A particular advantage of the use of a multilayer antireflection coating on the polycarbonate is in the increased reduction of reflectance over a substantially greater portion of the visible spectrum as compared to a single-layer antireflection coating.

In the process of applying the antireflection coating to the polycarbonate substrate, the dielectric material, e.g., magnesium fluoride, is placed in a metal boat, e.g., a tantalum boat, and such boat, together with the substrate or polycarbonate film to be coated, is positioned within a confined zone or chamber such as a bell jar, which is evacuated, e.g., by an oil diffusion pump. The boat containing the solid dielectric is heated by electrical resistance to a temperature at which the dielectric is vaporized, and the vaporizing zone is subjected to a high vacuum, preferably of the order of about $10^{-4}$ to about $10^{-5}$ mm. mercury. A high vacuum is employed in order to obtain minimum interference between the vaporized molecules or particles and the molecules of air, and also to prevent reaction of the highly reactive vapor particles heated to high temperature, with air molecules.

It is important that precautions be taken so that the polycarbonate substrate in the evacuated zone containing the heated dielectric be positioned with respect to the vaporization source such that there is minimum heat transfer by radiation from the dielectric being vaporized to the substrate. However, the polycarbonate substrate should not be positioned so far from the vaporization source that only a scattering of vapor molecules impinges on the surface, since it is important that the vapor in concentrated form strike the surface of the substrate in order to produce an efficient, uniform coating. This is accomplished usually by placing the polycarbonate film about 10 to 12 inches away from, or above, the vapor source. It is preferred to maintain the polycarbonate substrate at approximately or slightly above ambient temperature, preferably at a temperature of about 100° F. The maintenance of the substrate at about 100° F. is believed to assist in causing greater adherence of the dielectric coating to the substrate and to provide greater abrasion resistance of the antireflection coating. Suitable means such as a baffle or a chimney can be employed to direct radiation from the vapor source down and away from the polycarbonate substrate.

The thickness of the respective antireflection coating layers deposited can be monitored by any suitable means such as by measuring the reflectance of the respective coatings with monochromatic light (at 5500 A.), by a rapid-scan spectrophotometer which shows reflectance versus wavelength on a cathode ray tube during film deposition, or by a modulated beam photometer. It has been found convenient to monitor the optical thickness of the layer or layers of the antireflection coating deposited on the polycarbonate substrate by means of a modulated beam photometer, e.g., an Edwards High Vacuum Ltd. modulated beam photometer, which measures the minimum reflectance at a wavelength within a narrow band width region, e.g., approximately 5500 A.

In producing multilayer antireflection coatings, when the predetermined optical thickness of one layer of deposited dielectric material on the substrate is attained, heating of the vaporization source of such dielectric is discontinued, and without breaking vacuum another dielectric is heated to vaporization temperature to produce vapors which are deposited on the substrate to a predetermined optical thickness to form the next layer of the multilayer coating, and so on, until the desired number of layers are formed.

The following are examples of practice of the invention.

In the drawings, FIGS. 1, 2, 3 and 4 illustrate schematically and in an exaggerated manner for greater clarity, a polycarbonate substrate film having antireflection coatings thereon composed of a single, double, quadruple and triple layer, respectively. FIG. 5 is a plot of percent reflectance against wavelength in the visible spectrum for the coatings produced in Examples 1 to 4 below.

Example 1

An antireflection coating indicated by numeral 12 is formed on a polycarbonate film substrate indicated by numeral 10, as illustrated in FIG. 1, by vacuum deposition of magnesium fluoride at $10^{-5}$ mm. mercury with the substrate maintained at about 100° F. The optical thickness of the magnesium fluoride antireflection coating is monitored by means of a modulated beam photometer to an optical thickness of $\frac{1}{4}\lambda$.

At 5500 A., the percent reflectance of the magnesium fluoride-coated polycarbonate substrate of FIG. 1 was reduced to 1.25%, as compared with 5.1% for the uncoated polycarbonate substrate.

However, such single magnesium fluoride antireflection layer does not adhere very well to the polycarbonate film and can be rubbed off. Thus, such single magnesium fluoride layers cannot endure continuous handling, and are thus limited in use, e.g., to non-exposed applications.

*Example 2*

Figure 2:
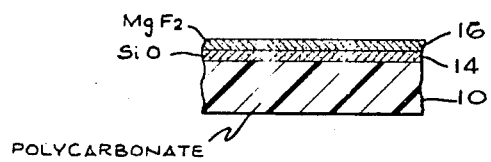

A double layer antireflection coating is formed on a polycarbonate film substrate having a thickness of about 5 mils, by first depositing a silicon monoxide coating 14 on the substrate 10, as illustrated in FIG. 2, the silicon monoxide being of the type which is deposited slowly and oxidized, and having a refractive index of about 1.7. The optical thickness of the initial silicon monoxide layer is monitored to $\frac{1}{4}\lambda$. A second coating 16 of magnesium fluoride is then deposited over the initial silicon monoxide layer, to an optical thickness of $\frac{1}{4}\lambda$ also. During the deposition of both of the layers 14 and 16, the polycarbonate substrate is maintained at a temperature somewhat above ambient, of the order of about 100° F. The polycarbonate substrate containing the double layer antireflection coating shown in FIG. 2 has a reflectance of about 1.75% at 5500 A.

The magnesium fluoride in the second layer of the antireflection coating described above can be replaced by cryolite, providing an antireflection coating producing a reduction in reflectance similar to the antireflection coating described above.

*Example 3*

Figure 3:
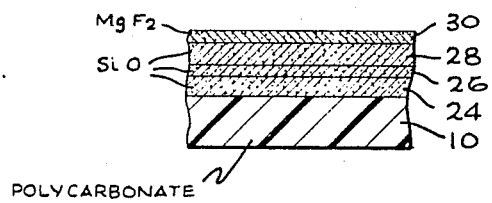

A four-layer antireflection coating is deposited on a polycarbonate film, as indicated in FIG. 3 by depositing in succession three silicon monoxide layers, the first and third silicon monoxide layers 24 and 28 being monitored to an optical thickness of $\frac{1}{2}\lambda$, and the second or intermediate silicon monoxide layer 26 to an optical thickness of $\frac{1}{4}\lambda$. The first and third silicon monoxide layers are of the type wherein the SiO is deposited quickly and unoxidized, and having a refractive index of approximately 2.1, the intermediate silicon monoxide layer 26 being of the type wherein the SiO was deposited slowly and oxidized, and has a refractive index of about 1.7.

The first SiO layer 24 of refractive index about 2.1 is deposited at a chamber pressure of about $1.4 \times 10^{-5}$ mm. mercury. Following deposition of layer 24 to the desired optical thickness of $\frac{1}{2}\lambda$, the chamber pressure is increased to about $9 \times 10^{-5}$ mm. mercury, resulting in deposition of the second SiO layer 26 of refractive index of about 1.7 to the desired optical thickness of about $\frac{1}{4}\lambda$. Then the chamber pressure is again reduced back to about $1.4 \times 10^{-5}$ mm. mercury, resulting in deposition of the third SiO layer 28 of refractive index of about 2.1 to the desired depth of $\frac{1}{2}\lambda$.

A fourth antireflection layer 30 is applied over the third SiO layer 28, the fourth layer being magnesium fluoride deposited to an optical thickness of $\frac{1}{4}\lambda$.

The reflectance of the system of FIG. 3 composed of a four-layer antireflection coating on the polycarbonate substrate is 1.2% at 5500 A.

*Example 4*

A four-layer antireflection coating on a polycarbonate substrate is provided as in FIG. 3, and as described in Example 3 above, composed of 3 SiO layers and a top layer of $MgF_2$, except that in the present instance, the first and third silicon monoxide layers 24 and 28 are each deposited to an optical thickness of $\frac{1}{4}\lambda$, and the intermediate silicon monoxide layer 26 is deposited to an optical thickness of $\frac{1}{2}\lambda$.

The reflectance of this alternative system comprising a polycarbonate substrate and a four-layer antireflection coating is 0.8% at 5500 A.

The plot in FIG. 5 of the drawing shows the percent reflectance over the visible spectrum, of the uncoated polycarbonate film in comparison to the systems of FIGS. 1, 2 and 3, as described in Examples 1 to 4 above, for single, double and four-layer antireflection coatings.

From the plot in FIG. 5 it is seen that a substantial reduction in reflectance over the visible spectrum is obtained by the single-layer antireflection coating system of Example 1, as represented by curve B in the plot, as compared to the uncoated polycarbonate represented by curve A. Also, the double-layer antireflection coating on the polycarbonate, as represented by curve C of the plot, results in substantial reduction in reflectance over the visible spectrum as compared to the uncoated polycarbonate represented by curve A.

However, of particular significance, it is apparent that the four-layer materials described in Examples 3 and 4 above, and whose reflectance is illustrated by curves D and E, respectively, in FIG. 5 of the drawing, not only provide an even greater reduction in reflectance, as compared to the single- and double-layer coatings of Examples 1 and 2 (see curves B and C), but that the reflectance of these four-layer coatings as represented by curves D and E in the plot of FIG. 5 remain low and substantially constant over a substantial portion of the visible spectrum.

The reflectance curves in FIG. 5 were obtained with a Cary 14 spectrophotometer and an integrating sphere reflectance attachment.

*Example 5*

A four-layer antireflection coating is formed on a polycarbonate substrate film as described in Example 3 and illustrated in FIG. 3 of the drawing, except that in place of employing silicon monoxide as first and third layers, zirconium dioxide, stannic oxide, or cerium oxide, is employed for producing said first and third layers.

A polycarbonate 4-layer antireflection coating system is provided in each instance having a reflectance of the order of about 1% in the visible spectrum.

*Example 6*

Figure 4:
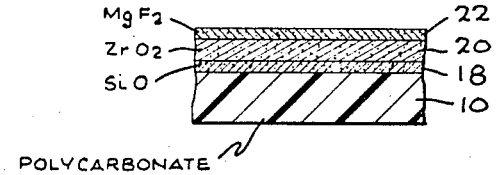

A three-layer antireflection coating is deposited on a polycarbonate film 10 by first depositing a silicon monoxide layer to an optical thickness of $\frac{1}{4}\lambda$, represented by numeral 18 in FIG. 4, such coating being of the type having a refractive index of about 1.7, then depositing a layer of zirconium dioxide 20 over the silicon monoxide layer 18, to an optical thickness of $\frac{1}{2}\lambda$, followed by the deposition of a third dielectric layer 22 of magnesium fluoride to an optical thickness of $\frac{1}{4}\lambda$ over the intermediate zirconium dioxide film. During deposition of the three layers 18, 20 and 22, the substrate 10 is maintained at a temperature not in excess of about 100° F.

The resulting antireflection coating formed on the polycarbonate substrate is highly adherent and abrasion resistant, and has a low reflectance in the visible spectrum of the order of about 1%.

*Example 7*

A three-layer antireflection coating is formed on a polycarbonate substrate as described in Example 6 and illustrated in FIG. 4 of the drawing, except that in place of the zirconium dioxide intermediate layer, an intermediate layer of stannic oxide, cerium oxide, or silicon monoxide of refractive index 2.1 is provided, to an optical thickness also of $\frac{1}{2}\lambda$.

The antireflection coating thus formed, in which the intermediate layer of FIG. 4 is stannic oxide, cerium oxide, or silicon monoxide of refractive index 2.1, is also an adherent, abrasion-resistant coating, such polycarbonate three-layer antireflection coating system having a reflectance of about 1% in the visible region of the spectrum.

From the foregoing, it is seen that the invention provides a transparent polycarbonate film or sheet having an efficient antireflection coating thereon in the form of single or multi-layer coatings, substantially reducing the reflectance of the polycarbonate film as compared to the uncoated polycarbonate, and resulting in a transparent film having substantially improved optical characteristics and providing an efficient antireflecting optical medium of substantial application.

While I have described particular embodiments of my invention for the purpose of illustration, it should be understood that various modifications and adaptations thereof may be made within the spirit of the invention, as set forth in the appended claims.

I claim:
1. A transparent polycarbonate film containing on a surface thereof a multilayer transparent antireflection coating comprising three successive layers of silicon monoxide, each of said layers having a different index of refraction from an adjacent silicon monoxide layer, and a fourth layer of magnesium fluoride over the third layer of silicon monoxide.

2. A transparent polycarbonate film containing on a surface thereof a four-layer transparent antireflection coating, the first layer adjacent said film and said third layer each being selected from the group consisting of zirconium dioxide, stannic oxide, cerium oxide, and silicon monoxide having an index of refraction of about 2.10, the second intermediate layer being a silicon monoxide layer having an index of refraction of about 1.6 to about 1.8, the fourth layer being magnesium fluoride.

3. A transparent polycarbonate film containing on a surface thereof a four-layer transparent antireflection coating comprising three successive layers of silicon monoxide, the first layer adjacent said film and said third layer each having an index of refraction of about 2.10 and an optical thickness of $\frac{1}{2}\lambda$, the second intermediate silicon monoxide layer having an index of refraction of about 1.6 to about 1.8 and an optical thickness of $\frac{1}{4}\lambda$, and a fourth layer of magnesium fluoride over said third layer, said fourth layer having an optical thickness of $\frac{1}{4}\lambda$, said indices of refraction being at 5500 A. and wherein $\lambda$ is a wavelength within the visible spectrum.

4. A transparent polycarbonate film containing on a surface thereof a four-layer transparent antireflection coating comprising three successive layers of silicon monoxide, the first layer adjacent said film and said third layer each having an index of refraction of about 2.10 and an optical thickness of $\frac{1}{4}\lambda$, the second intermediate silicon monoxide layer having an index of refraction of about 1.6 to about 1.8 and an optical thickness of $\frac{1}{2}\lambda$, and a fourth layer of magnesium fluoride over said third layer, said fourth layer having an optical thickness of $\frac{1}{4}\lambda$, said indices of refraction being at 5500 A. and wherein $\lambda$ is a wavelength within the visible spectrum.

5. A transparent polycarbonate film containing on a surface thereof a three-layer transparent antireflection coating, comprising a first layer of silicon monoxide adjacent said film, said silicon monoxide layer having a refractive index of about 1.6 to about 1.8, a second layer of a dielectric material selected from the group consisting of zirconium dioxide, stannic oxide, cerium oxide, and silicon monoxide having an index of refraction of about 2.1, and a third layer of magnesium fluoride over said second layer.

6. A transparent polycarbonate film containing on a surface thereof a three-layer transparent antireflection coating comprising a first layer of silicon monoxide adjacent said film, said silicon monoxide having an index of refraction of about 1.6 to about 1.8, at about 5500 A., and an optical thickness of $\frac{1}{4}\lambda$, a second layer of a dielectric selected from the group consisting of zirconium dioxide, stannic oxide, cerium oxide, and silicon monoxide having a refractive index of about 2.1 at 5500 A., said dielectric having an optical thickness of $\frac{1}{2}\lambda$, and a third layer of magnesium fluoride over said second layer, said magnesium fluoride having an optical thickness of $\frac{1}{4}\lambda$, where $\lambda$ is a wavelength within the visible spectrum.

7. A transparent polycarbonate substrate as defined in claim 6, wherein said dielectric of said second layer is zirconium dioxide.

8. A transparent polycarbonate film as defined in claim 6, wherein said dielectric of said second layer is silicon monoxide having a refractive index of about 2.1.

References Cited
UNITED STATES PATENTS

| | | | |
|---|---|---|---|
| 2,366,687 | 1/1945 | Osterberg | 117—71 X |
| 2,601,806 | 7/1952 | Turner | 117—33.3 X |
| 2,624,238 | 1/1953 | Widdop et al. | 117—33.3 X |
| 2,641,954 | 6/1953 | Scharf et al. | 117—106 X |
| 2,858,240 | 10/1958 | Turner et al. | 117—33.3 X |
| 2,964,427 | 12/1960 | Rheinberger et al. | 117—33.3 X |
| 3,069,287 | 12/1962 | Hudson | 117—138.8 |
| 3,147,132 | 9/1964 | Geffcken | 117—33.3 |
| 3,185,020 | 5/1965 | Thelen | 117—33.3 X |

WILLIAM D. MARTIN, *Primary Examiner.*

T. G. DAVIS, *Assistant Examiner.*